(12) United States Patent
Wu

(10) Patent No.: US 6,178,649 B1
(45) Date of Patent: Jan. 30, 2001

(54) OPTICAL CALIBRATING APPARATUS FOR EMITTING DATUM LASER LINE

(76) Inventor: Chyi-Yiing Wu, 3F, No. 48, Shih-Ping Street, Taipei (TW)

( * ) Notice: Under 35 U.S.C. 154(b), the term of this patent shall be extended for 0 days.

(21) Appl. No.: 09/223,862

(22) Filed: Dec. 31, 1998

(30) Foreign Application Priority Data

Jan. 16, 1998 (TW) .................................................. 87200712

(51) Int. Cl.⁷ .................................................. G01C 15/00
(52) U.S. Cl. ........................ 33/286; 33/DIG. 21; 33/374; 33/375; 362/259
(58) Field of Search ............................. 33/286, 533, 645, 33/DIG. 21, 374, 375; 362/259

(56) References Cited

U.S. PATENT DOCUMENTS

| | | | |
|---|---|---|---|
| 4,897,851 | * 1/1990 | Vecht et al. | 372/107 |
| 5,323,555 | * 6/1994 | Jehn | 42/103 |
| 5,359,781 | * 11/1994 | Melville | 33/286 |
| 5,572,796 | * 11/1996 | Breda | 33/283 |
| 5,680,208 | * 10/1997 | Butler et al. | 356/250 |
| 5,912,733 | * 1/1999 | Dunlop et al. | 365/250 |

* cited by examiner

Primary Examiner—Diego Gutierrez
Assistant Examiner—Lydia De Jesús

(57) ABSTRACT

An optical calibrating apparatus includes: a laser illuminator (6) disposed in an eccentric adjusting sleeve (5), an inner inclined adjusting sleeve (4) within a jacket (3), an outer inclined adjusting sleeve (2) outside the jacket (3), and a cylindrical casing (1), in which a laser line is emitted by the illuminator (6) for checking levelling, plumbing and verticality and the laser line has been calibrated for a horizontality or a verticality by rotating the eccentric adjusting sleeve (4), the inner and outer inclined adjusting sleeves (4, 2) until the emitted laser line is aligned with a standard laser line emitted from a standard optical calibrator or aligned with a mark preset by a standard instrument.

8 Claims, 5 Drawing Sheets

OPTICAL CALIBRATING APPARATUS FOR EMITTING DATUM LASER LINE

BACKGROUND OF THE INVENTION

U.S. patent application Ser. No. 09/024,340 filed on: Feb. 17, 1998 by the same inventor, C. Y. Wu of this application disclosed an automatic optical levelling, plumbing, and verticality-determining apparatus having a plumb device secured with a horizontality calibrator universally pendulously mounted on the frame, in which a plurality of screws are provided for operatively adjusting the horizontality calibrator by slidably moving the inner ring of the calibrator about the longitudinal center of the pendulating stem of the plumb device until a gravity center of the plumb device is aligned with the plumb line of the plumb device as checked by a bubble level.

However, the screws used for the adjustment may cause deformation for the instrument elements having thin wall and may also accumulate stress as tightened by the screws during their adjustment, thereby gradually releasing the stress to further cause deviation from the horizontality or verticality, and influencing the measurement precision accordingly.

The present inventor has found the drawbacks of the conventional optical device and invented the present optical calibrating apparatus.

SUMMARY OF THE INVENTION

The object of the present invention is to provide an optical calibrating apparatus including: a laser illuminator (6) disposed in an eccentric adjusting sleeve (5), an inner inclined adjusting sleeve (4) within a jacket (3), an outer inclined adjusting sleeve (2), and a cylindrical casing (1), in which a laser line is emitted by the illuminator (6) for checking levelling, plumbing and verticality and the laser line has been calibrated for a horizontality or a verticality by rotating the eccentric adjusting sleeve (4), the inner and outer inclined adjusting sleeves (4, 2) until the emitted laser line is aligned with a standard laser line emitted from a standard optical calibrator or aligned with a mark preset by a standard instrument.

DETAILED DESCRIPTION

Figure 1:
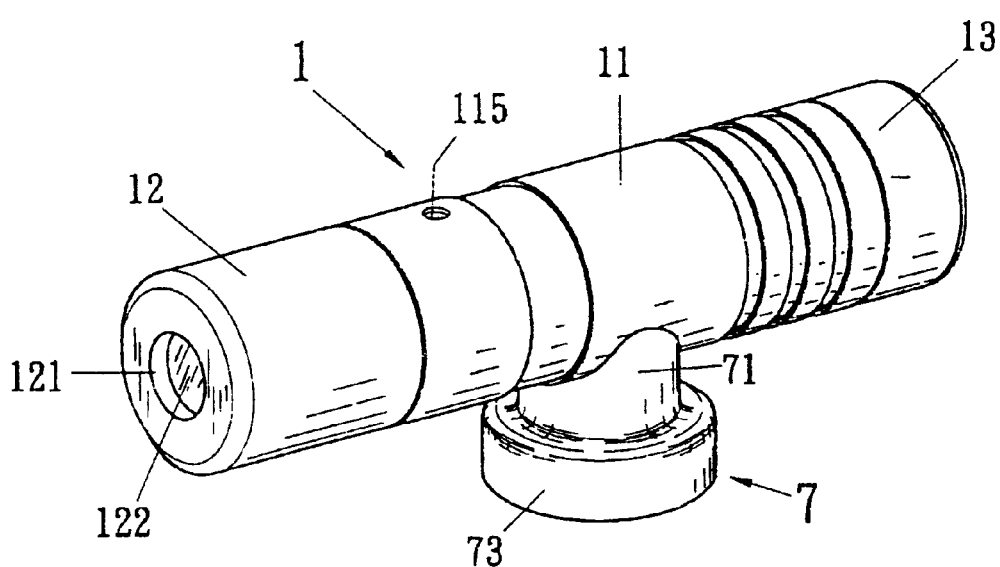
FIG. 1 is a perspective view of the present invention.
Figure 2:
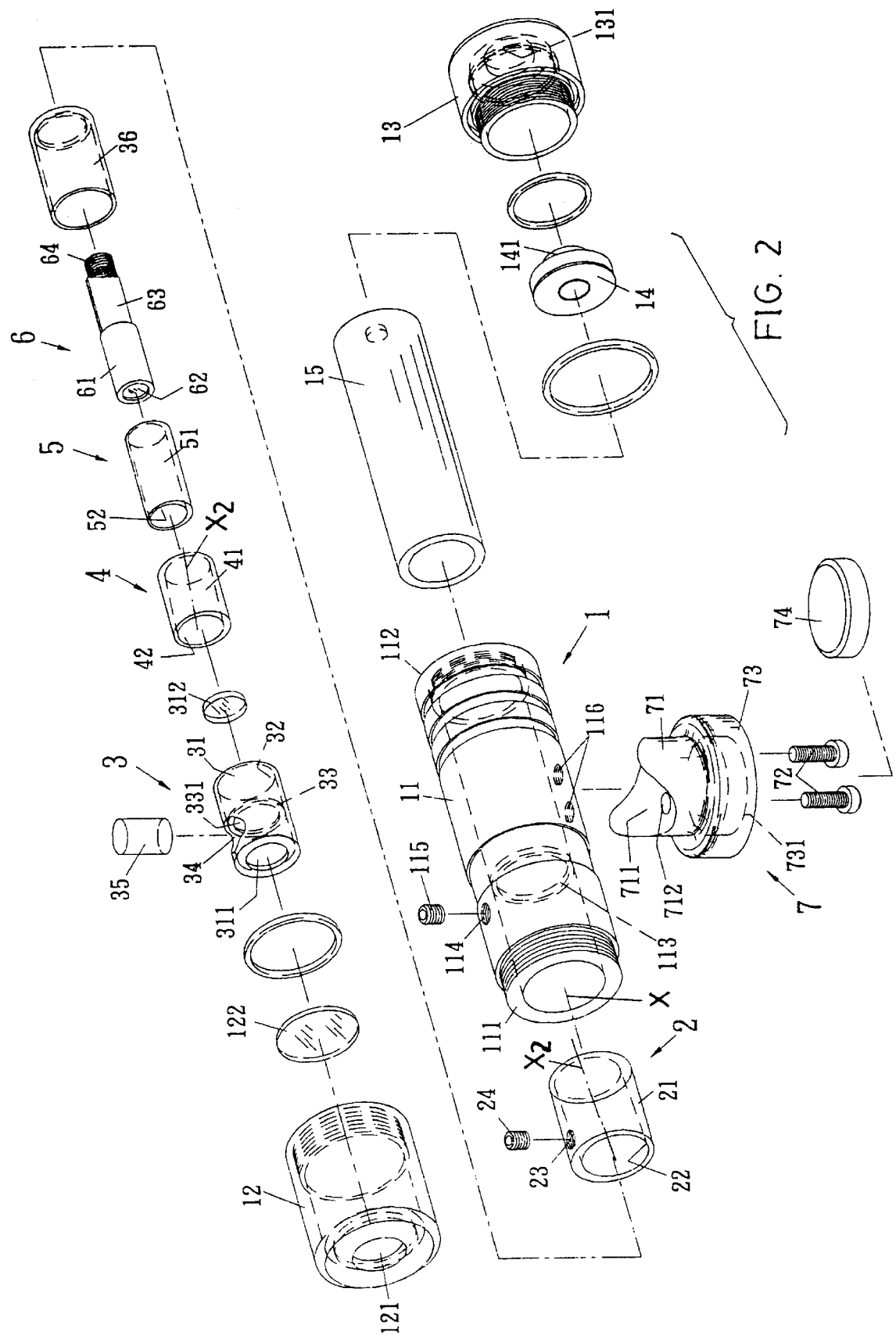
FIG. 2 is an exploded view of the elements of the present invention.

As shown in FIGS. 1–4, the present invention comprises: a cylindrical casing 1, an outer inclined adjusting sleeve 2, a jacket 3, an inner inclined adjusting sleeve 4, an eccentric adjusting sleeve 5, a laser illuminator 6 and a base 7.

The cylindrical casing 1 includes: a hollow cylinder 11 having a front cover 12 fixed on a front end portion 111 of the hollow cylinder 11, and a rear cover 13 secured on a rear end portion 112 of the hollow cylinder 11, having a longitudinal axis X defined at a longitudinal center of the hollow cylinder 11.

The hollow cylinder 11 is formed with an annular extension 113 on an inside wall at an intermediate position of the hollow cylinder 11, and is formed with a screw hole 114 adjacent to the front end portion 111 of the hollow cylinder 11 to be fixed therein with a sealing screw 115.

The front cover 12 is formed with a front opening 121 having a transparent glass 122 secured in the front opening 121 and a front chamber C1 defined between the transparent glass 122 and the annular extension 113 in the hollow cylinder 11 for mounting the elements in construction of the present invention.

The rear cover 13 is secured with a push button 141 of the switch 14 in a rear opening 131 formed in the rear cover 13. A rear chamber C2 is defined between the push button 141 and the annular extension 113 in the hollow cylinder 11 for storing battery 15 in the rear chamber C2.

The outer inclined adjusting sleeve 2 includes: an outer cylindrical surface 21 slidably rotatably engageable with an inside wall of the front chamber C1 of the hollow cylinder 11 as defined between the front cover 12 and the annular extension 113 positioned at an intermediate portion in the hollow cylinder 11, an inside cylindrical hole 22 defining a longitudinal axis X1 at a longitudinal center of the inside cylindrical hole 22 within the outer inclined adjusting sleeve 2 with the longitudinal axis X1 inclined from the longitudinal axis X of the hollow cylinder 11 of the casing 1 and with the inside cylindrical hole 22 for disposing the jacket 3 therein; and a screw hole 23 formed in the outer inclined adjusting sleeve 2 for inserting a sealing screw 24 therein.

The jacket 3 is formed with: a front cylindrical portion 31 having a front opening 311 formed in a front end of the front cylindrical portion 31 for securing a transparent glass 312 in the front opening 311; an annular extension 33 annularly formed in an inside hole 32 formed through the front cylindrical portion 31; a front socket 34 defined between the transparent glass 312 and the annular extension 33 for mounting a cylindrical-surfaced lens or prism 35 in the front socket 34 as transversely inserted through a lens opening 331 formed in the front cylindrical portion 31; and a rear cylindrical portion 36 combinable with the front cylindrical portion 31 for mounting the inner inclined adjusting sleeve 4, the eccentric adjusting sleeve 5 and the laser illuminator 6 within the rear cylindrical portion 36 of the jacket 3.

The inner inclined adjusting sleeve 4 includes: an outer cylindrical surface 41 slidably rotatably engageable with an inside wall in the rear cylindrical portion 36 of the jacket 3 as defined between the annular extension 33 and the rear cylindrical portion 36 of the jacket 3, and an inside cylindrical hole 42 defining a longitudinal axis X2 at a longitudinal center of the inside cylindrical hole 42 with the longitudinal axis X2 deviated from the longitudinal axis X of the hollow cylinder 11 of the casing 1 for disposing the eccentric adjusting sleeve 5 within the inside cylindrical hole 42 in the inner inclined adjusting sleeve 4.

The eccentric adjusting sleeve 5 includes: an outer cylindrical surface 51 slidably rotatably engageable with the inside cylindrical hole 42 of the inner inclined adjusting sleeve 4, and an inner eccentric hole 52 eccentrically formed through the eccentric adjusting sleeve 5 with the inner eccentric hole 52 longitudinally parallel to the outer cylindrical surface 51 of the eccentric adjusting sleeve 5, and with a rear sleeve portion of the eccentric adjusting sleeve 5 protruding rearwardly to be positioned beyond a rear end of the inner inclined adjusting sleeve 4.

The laser illuminator 6 includes: an outer cylindrical surface 61 slidably rotatably engageable with the inner eccentric hole 52 of the eccentric adjusting sleeve 5, a focussing lens 62 fixed at a front end of the laser illuminator 6 and aligned with the cylindrical-surfaced lens 35 in the jacket 3, an integrated circuit (including laser diode) 63 for producing laser light for the laser illuminator 6 formed at a rear portion of the laser illuminator 6, and an electrically conductive spring coil 64 retained, adjacent to the annular extension 113 of the casing 1, between the integrated circuit 63, protruding through a rear opening of the rear cylindrical portion 36 of the jacket 3, and the battery 15 stored in the rear chamber C2 of the casing 1, thereby powering the integrated circuit 63 for lighting the laser illuminator 6 by the battery 15. The illuminator 6 is controlled by the switch 14 provided at a rear portion of the casing 1.

The base 7 includes: a stem 71 protruding upwardly from a bottom disk 73 having a horizontal bottom surface B formed at a bottom of the bottom disk 73, a plurality of screws 72 rotatably mounted in the base 7 through a plurality of screw holes 712 vertically formed through the stem 71, an arcuate recess 711 concave in an upper portion of the stem 71 to be rotatably engageable with the hollow cylinder 11 of the casing 1 for resting the hollow cylinder 11 of the casing 1 on the arcuate recess 711 of the base 7, with each screw 72 rotatably engageable with a screw hole 116 formed through the hollow cylinder 11 for securing the base 7 under the hollow cylinder 11 of the casing 1, and a magnet 74 mounted in a cavity 731 recessed in the bottom of the base 7 to be magnetically attracted on a flat horizontal or vertical surface made of ferrous material.

Figure 5:
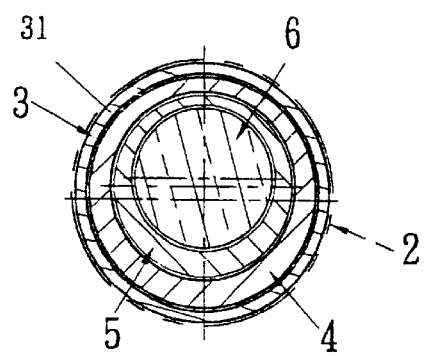
FIG. 5 is a partial cross sectional drawing of the present invention showing a primary calibration adjustment.

When assembling the elements of the present invention (FIG. 5), the laser illuminator 6 is slidably engaged in the inner eccentric hole 52 of the eccentric adjusting sleeve 5 and the eccentric adjusting sleeve 5 is slidably engaged in the inside cylindrical hole 42 of the inner inclined adjusting sleeve 4, while the inner inclined adjusting sleeve 4 is slidably engaged in the inside hole 32 of the jacket 3; and the illuminator 6 and sleeves 4, 5 are mounted on a standard calibration instrument having a horizontal platform (not shown), whereby upon lighting of the illuminator 6 to project laser light outwardly to display the optical image (laser line) on a wall to check whether it is coincided with a mark as preset by the standard calibrating instrument (The mark may be an optical image, a horizontal or vertical line as emitted from a standard laser instrument). If there is a deviation of optical image as effected by the present invention from the preset mark, the inner inclined adjusting sleeve 4, the eccentric adjusting sleeve 5 and the laser illuminator 6 may be rotated respectively to match the optical image of the present invention with the preset mark for a primary calibration for obtaining, for instance, a datum horizontal or vertical laser line of the present invention.

After completing the primary calibration or adjustment, an adhesive (not shown) may be filled into the apertures among the laser illuminator 6, the eccentric adjusting sleeve 5, the inner inclined adjusting sleeve 4 and the jacket 3 for deadly locking the position of the elements (6, 5, 4) within the jacket 3 by combining the rear and front cylindrical portions 36, 31 of the jacket 3. After curing of the adhesive in the jacket 3, the jacket 3 is slidably mounted in the outer inclined adjusting sleeve 2. The outer inclined adjusting sleeve 2 is then slidably mounted in the front chamber C1 in the hollow cylinder 11 of the casing 1, and the hollow cylinder 11 is then fixed and rested on the base 7.

Upon lighting of the illuminator 6 for further calibrating the laser light (line) as emitted from the illuminator 6 and through the lens 35 on the jacket 3 when the apparatus of this invention is placed on a standard horizontal platform (not shown), the outer inclined adjusting sleeve 2 or the jacket 3 may be rotated (such as for adjusting the height of the emitted light) until matching the laser light from the illuminator 6 with a mark as preset by the standard calibrating instrument (The mark may be an optical image such as a horizontal or vertical line as emitted from a standard laser instrument). Then, the adhesive may be filled, through the screw hole 24 in the outer sleeve 2, into the boundary between the outer sleeve 2 and the jacket 3 for stably bonding the outer sleeve 2 with the jacket 3. Also, the adhesive may be filled, through the screw hole 114 in the hollow cylinder 1, into the boundary between the hollow cylinder 11 and the outer sleeve 2 for bonding the hollow cylinder 11 with the outer sleeve 2. The front cover 12 may be finally covered on the front portion of the casing. The adhesive may be cured by drying for firmly fixing the elements of the present invention.

Figure 6:
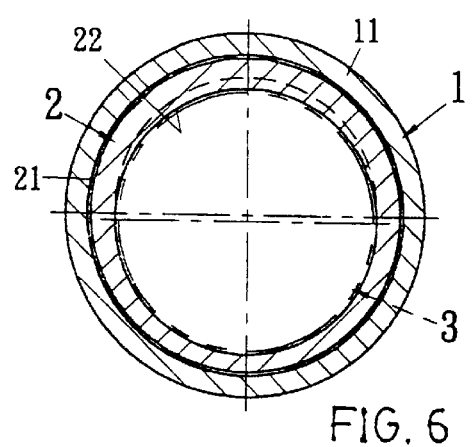
FIG. 6 is a partial cross sectional drawing of the present invention showing a secondary calibration adjustment.

After completing the secondary calibration (FIG. 6), the sealing screws 24, 115 may be respectively fixed into the screw holes 23, 114 and the front cover 12 may be secured on a front portion of the hollow cylinder 11 of the casing 1 as shown in FIG. 1.

Figure 3:
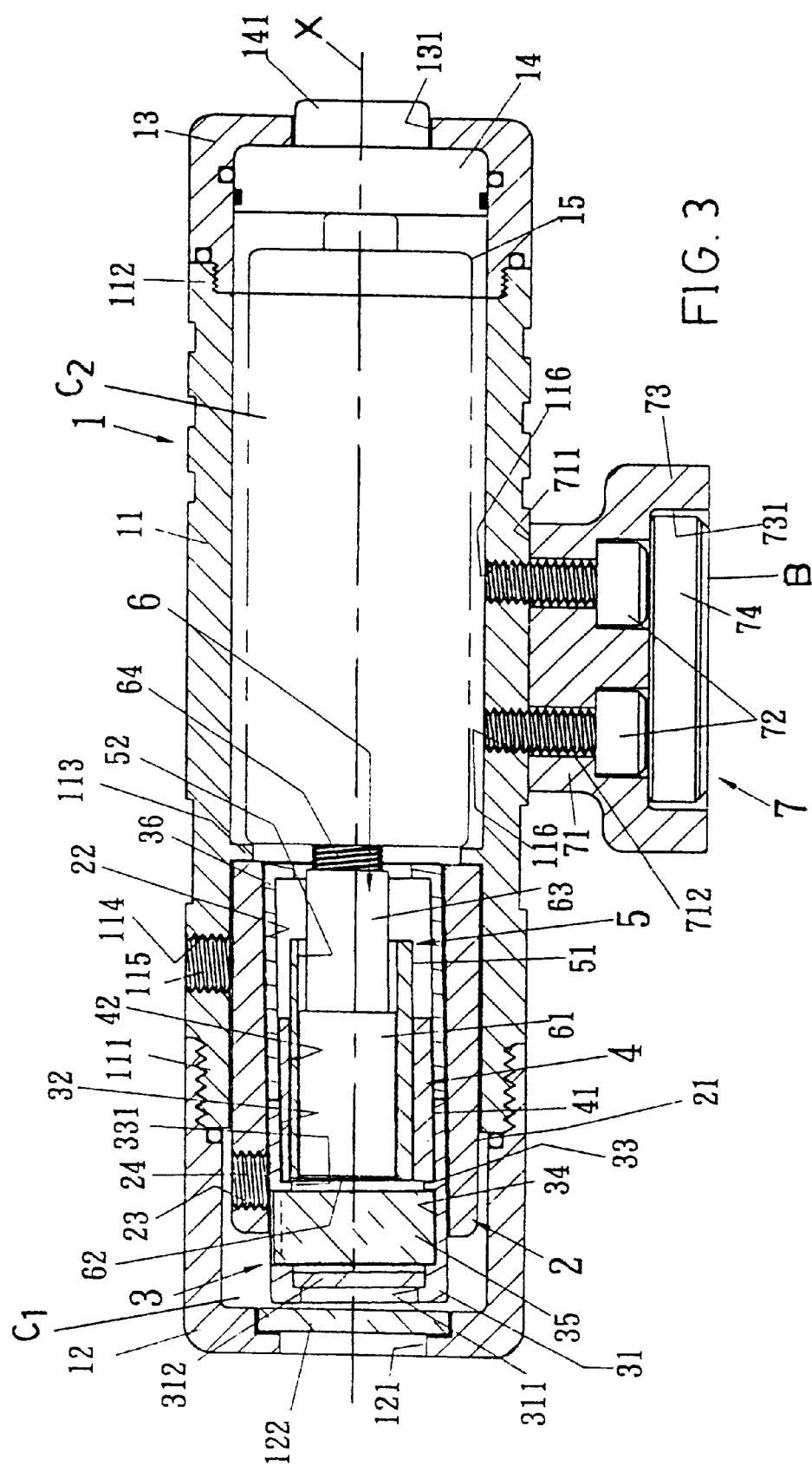
FIG. 3 is a longitudinal sectional drawing of the present invention as assembled.
Figure 4:
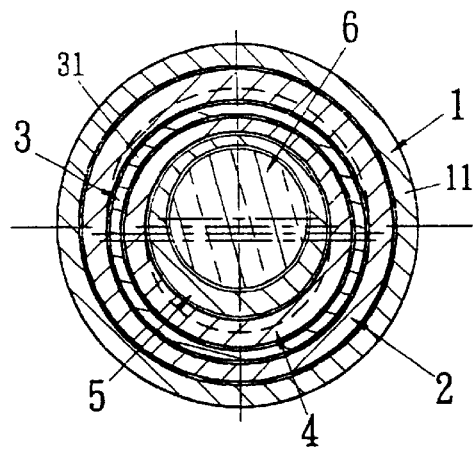
FIG. 4 is a cross sectional drawing of the present invention when assembled.
Figure 7:
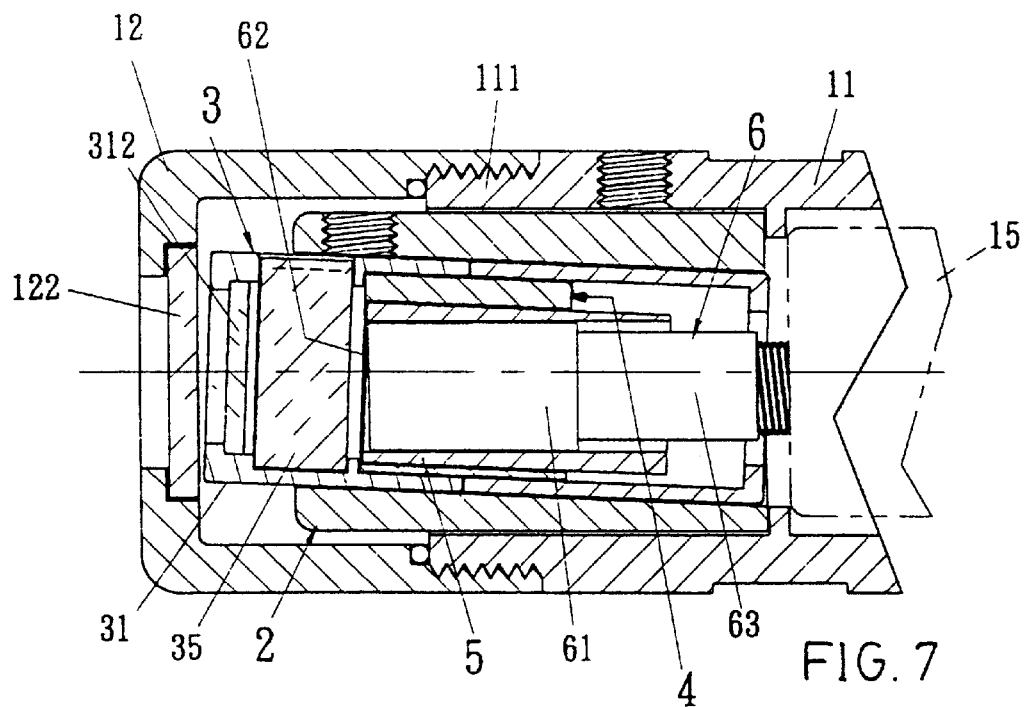
FIG. 7 is a partial longitudinal sectional drawing of another modification of the present invention.

As shown in FIG. 7, the arrangement, the dimension, and the inclination angles of the relevant sleeves 2, 4, 5 may be varied from that as shown in FIG. 3 to form another preferred embodiment of the present invention. The sleeve 5 is now modified as an inclined sleeve having an inclined inside hole formed therethrough; while the sleeve 4 is modified to be an eccentric sleeve having an eccentric hole formed therethrough.

Figure 8:
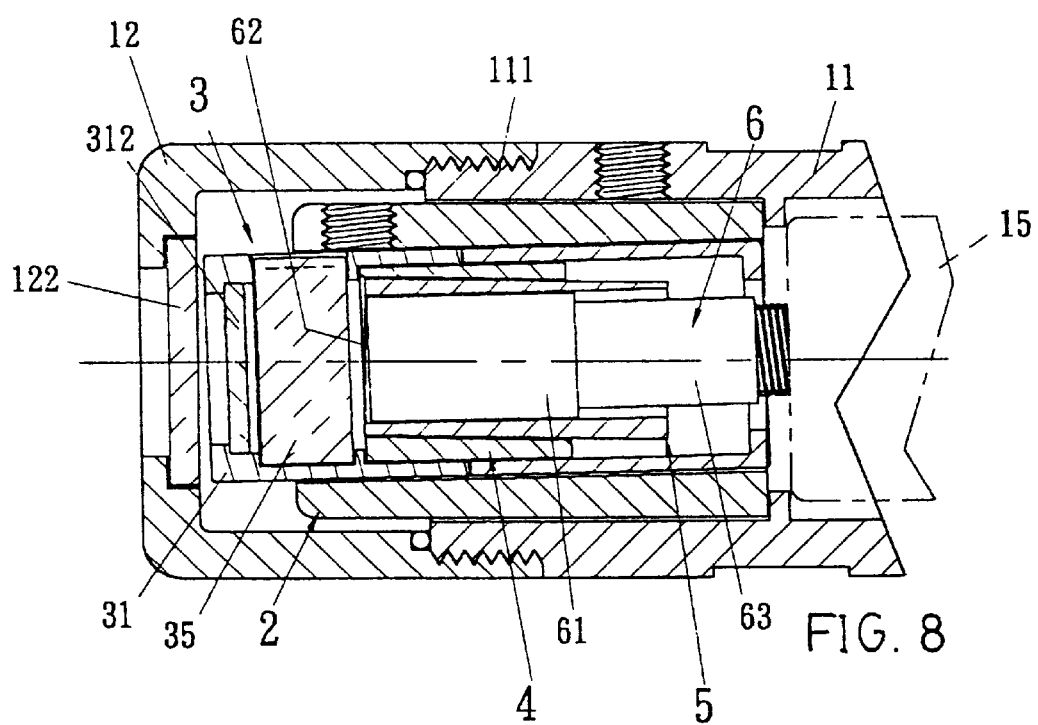
FIG. 8 is a partial longitudinal sectional drawing of still another modification of the present invention.

As shown in FIG. 8, the eccentric adjusting sleeve 5 may be modified to be another inclined adjusting sleeve having an inclined inside cylindrical hole similar to the inclined inside cylindrical hole 42 as formed in the inner inclined adjusting sleeve 4, which is not limited in the present invention.

The present invention may emit a datum laser light (line) for optical calibration and is superior to the prior art because the eccentric and inclined sleeves may be freely rotated to have a convenient calibration for the laser instrument to prevent from deformation or errors caused by stress released from the conventional device which is adjusted by screws.

After completing the calibration, the adhesive is provided for bonding the corresponding parts or elements to prevent breakage or damage of the instrument for a prolonged service life.

The present invention may be modified without departing from the spirit and scope of the present invention.

I claim:
1. An optical calibrating apparatus comprising:
   a casing (1) having a hollow cylinder (11) mounted on a base (7) and defining a front chamber (C1) in a front portion and a rear chamber (C2) in a rear portion of said casing (1);
   an outer inclined adjusting sleeve (2) rotatably engageable in the front chamber (C1) of the casing (1);
   a jacket (3) disposed within said outer inclined adjusting sleeve (2) having a lens mounted on a front portion of the jacket (3); an inner inclined adjusting sleeve (4) rotatably engageable in said jacket (3);

an eccentric adjusting sleeve (5) rotatably engageable within said inner inclined adjusting sleeve (4); and a laser illuminator (6) operatively emitting a laser light outwardly through said lens on said jacket (3) for an optical calibration, with said laser illuminator (6) rotatably engageable within said eccentric adjusting sleeve (5), whereby upon rotation of either of said sleeves (2, 4, 5) and said illuminator (6) to allow the light as emitted from said illuminator (6) to be matched with a standard mark as preset from a standard calibration instrument, said sleeves (2, 4, 5) and said illuminator (6) are stably fixed in said casing to form a laser instrument as an optical calibrating apparatus for emitting a datum laser light for calibration use.

2. An optical calibrating apparatus according to claim 1, wherein said outer inclined adjusting sleeve (2) includes: an outer cylindrical surface (21) slidably rotatably engageable with an inside wall of the front chamber (C1) of the hollow cylinder (11) as defined between a front cover (12) and an annular extension (113) positioned at an intermediate portion in the hollow cylinder (11), an inside cylindrical hole (22) defining a longitudinal axis (X1) at a longitudinal center of the inside cylindrical hole (22) within the outer inclined adjusting sleeve (2), with the longitudinal axis (X1) inclined from a longitudinal axis (X) of the hollow cylinder (11) of the casing (1), and with the inside cylindrical hole (22) for disposing the jacket (3) therein.

3. An optical calibrating apparatus according to claim 1, wherein said jacket (3) is formed with: a front cylindrical portion (31) having a front opening (311) formed in a front end of the front cylindrical portion (31) for securing a transparent glass (312) in the front opening (311); an annular extension (33) annularly formed in an inside hole (32) formed through the front cylindrical portion (31); a front socket (34) defined between the transparent glass (312) and the annular extension (33) for mounting a cylindrical-surfaced lens (35) in the front socket (34) as transversely inserted through a lens opening (331) formed in the front cylindrical portion (31); and a rear cylindrical portion (36) combinable with the front cylindrical portion (31) for mounting the inner inclined adjusting sleeve (4), the eccentric adjusting sleeve (5) and the laser illuminator (6) within the rear cylindrical portion (36) of the jacket (3).

4. An optical calibrating apparatus according to claim 3, wherein said inner inclined adjusting sleeve (4) includes: an outer cylindrical surface (41) slidably rotatably engageable with an inside wall in the rear cylindrical portion (36) of the jacket (3) as defined between the annular extension (33) and the rear cylindrical portion (36) of the jacket (3), and an inside cylindrical hole (42) defining a longitudinal axis (X2) at a longitudinal center of the inside cylindrical hole (42), with the longitudinal axis (X2) deviated from the longitudinal axis (X) of the hollow cylinder (11) of the casing (1) for disposing the eccentric adjusting sleeve (5) within the inside cylindrical hole (42) in the inner inclined adjusting sleeve (4).

5. An optical calibrating apparatus according to claim 4, wherein said eccentric adjusting sleeve (5) includes: an outer cylindrical surface (51) slidably rotatably engageable with the inside cylindrical hole (42) of the inner inclined adjusting sleeve (4), and an inner eccentric hole (52) eccentrically formed through the eccentric adjusting sleeve (5) for disposing the laser illuminator (6) in the inner eccentric hole (52), with the inner eccentric hole (52) longitudinally parallel to the outer cylindrical surface (51) of the eccentric adjusting sleeve (5), and with a rear sleeve portion of the eccentric adjusting sleeve (4) protruding rearwardly to be positioned beyond a rear end of the inner inclined adjusting sleeve (4).

6. An optical calibrating apparatus according to claim 5, wherein said laser illuminator (6) includes: an outer cylindrical surface (61) slidably rotatably engageable with the inner eccentric hole (52) of the eccentric adjusting sleeve (5), a focussing lens (62) fixed at a front end of the laser illuminator (6) and aligned with the cylindrical-surfaced lens (35) in the jacket (3), an integrated circuit including a laser diode (63) for producing laser light for the laser illuminator (6) formed at a rear portion of the laser illuminator (6), and an electrically conductive spring coil (64) retained between the integrated circuit (63) and a battery (15) stored in the rear chamber (C2) of the casing (1) for thereby powering the integrated circuit (63) for lighting the laser illuminator (6) by the battery (15), and with said illuminator (6) controlled by a switch (14) provided at a rear portion of the casing (1).

7. An optical calibrating apparatus according to claim 1, wherein said base (7) includes: a stem (71) protruding upwardly from a bottom disk (73) having a horizontal bottom surface (B) formed at a bottom of the bottom disk (73), a plurality of screws (72) rotatably mounted in the base (7) through a plurality of screw holes (712) vertically formed through the stem (71), an arcuate recess (711) concave in an upper portion of the stem (71) to be rotatably engageable with the hollow cylinder (11) of the casing (1) for resting the hollow cylinder (11) of the casing (1) on the arcuate recess (711) of the base (7), with each said screw (72) rotatably engageable with a screw hole (116) formed through the hollow cylinder (11) for securing the base (7) under the hollow cylinder (11) of the casing (1), and a magnet (74) mounted in a cavity (731) recessed in the bottom of the base (7) to be magnetically attracted on a flat horizontal or vertical surface made of ferrous material.

8. An optical calibrating apparatus according to claim 1, wherein an adhesive is filled into a plurality of apertures among the laser illuminator (6), the eccentric adjusting sleeve (5), the inner inclined adjusting sleeve (4), the jacket (3), the outer inclined adjusting sleeve (2) and said casing (1) for bonding the illuminator, the sleeves, and the jacket within the casing.

* * * * *